US012413935B2

(12) United States Patent
Mariyani et al.

(10) Patent No.: US 12,413,935 B2
(45) Date of Patent: Sep. 9, 2025

(54) DELIVERY OF GEOGRAPHIC LOCATION FOR USER EQUIPMENT (UE) IN A WIRELESS COMMUNICATION NETWORK

(71) Applicant: T-MOBILE INNOVATIONS LLC, Overland Park, KS (US)

(72) Inventors: Anil Kumar Mariyani, Ashburn, VA (US); Rajil Malhotra, Olathe, KS (US); Anuj Sharma, Broadlands, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 195 days.

(21) Appl. No.: 18/461,147

(22) Filed: Sep. 5, 2023

(65) Prior Publication Data
US 2023/0413016 A1    Dec. 21, 2023

Related U.S. Application Data

(63) Continuation of application No. 17/495,633, filed on Oct. 6, 2021, now Pat. No. 11,785,423.

(51) Int. Cl.
*H04W 4/029* (2018.01)
*H04W 8/08* (2009.01)

(52) U.S. Cl.
CPC ............. *H04W 4/029* (2018.02); *H04W 8/08* (2013.01)

(58) Field of Classification Search
CPC ....... H04W 64/00; H04W 4/02; H04W 4/029; H04W 64/003; H04W 12/06; H04W 8/08
See application file for complete search history.

(56) References Cited

U.S. PATENT DOCUMENTS

| | | | |
|---|---|---|---|
| 10,531,420 B2 * | 1/2020 | Li | ............................ H04W 4/60 |
| 10,616,934 B2 | 4/2020 | Talebi Fard et al. | |
| 10,779,254 B2 | 9/2020 | Lee et al. | |
| 10,999,787 B2 * | 5/2021 | Dao | ...................... H04W 48/18 |
| 11,399,310 B1 | 7/2022 | Malhotra et al. | |
| 11,451,954 B1 | 9/2022 | Mariyani et al. | |
| 11,553,334 B1 | 1/2023 | Sharma et al. | |
| 11,558,732 B1 | 1/2023 | Malhotra et al. | |
| 11,576,056 B1 | 2/2023 | Sharma et al. | |
| 11,582,609 B2 | 2/2023 | Zhu et al. | |

(Continued)

FOREIGN PATENT DOCUMENTS

| | | |
|---|---|---|
| DE | 102021112407 A1 | 12/2021 |
| EP | 3952492 A1 | 2/2022 |

(Continued)

*Primary Examiner* — Dung Hong (57) ABSTRACT

A wireless communication network serves a User Equipment (UE) based on geographic coordinates for the UE. The wireless communication network exchanges authentication data with the UE and authenticates an identity of the UE. The wireless communication network obtains the geographic coordinates from the UE in response to authenticating the identity of the UE. The wireless communication network determines UE context for the UE based on the geographic coordinates for the UE. The wireless communication network exchanges user data with the UE based on the UE context. The wireless communication network receives a location request for the UE and responds to the location request with the geographic coordinates for the UE.

20 Claims, 9 Drawing Sheets

(56) References Cited

U.S. PATENT DOCUMENTS

| | | | |
|---|---|---|---|
| 11,602,003 B1 | 3/2023 | Bertz et al. | |
| 2016/0007138 A1 | 1/2016 | Palanisamy et al. | |
| 2018/0227872 A1* | 8/2018 | Li | H04W 76/20 |
| 2018/0317157 A1* | 11/2018 | Baek | H04W 28/16 |
| 2019/0007992 A1* | 1/2019 | Kim | H04W 76/27 |
| 2019/0053010 A1 | 2/2019 | Edge et al. | |
| 2019/0116486 A1 | 4/2019 | Kim et al. | |
| 2019/0182875 A1* | 6/2019 | Talebi Fard | H04W 76/11 |
| 2019/0394746 A1* | 12/2019 | Edge | H04W 76/12 |
| 2020/0196101 A1* | 6/2020 | Edge | H04W 12/06 |
| 2020/0196298 A1* | 6/2020 | Edge | H04W 4/029 |
| 2020/0288313 A1 | 9/2020 | Kunz et al. | |
| 2021/0037496 A1 | 2/2021 | Ryu et al. | |
| 2021/0160666 A1 | 5/2021 | Zaifuddin | |
| 2021/0168584 A1* | 6/2021 | Li | H04W 48/18 |
| 2021/0266702 A1* | 8/2021 | Huang | H04W 4/02 |
| 2022/0103973 A1 | 3/2022 | Sirotkin et al. | |
| 2023/0083985 A1* | 3/2023 | Kim | H04W 76/27 |
| | | | 370/329 |

FOREIGN PATENT DOCUMENTS

| | | | | |
|---|---|---|---|---|
| KR | 20210115613 A | | 9/2021 | |
| KR | 102425424 B1 | | 7/2022 | |
| WO | WO-2018176425 A1 | * | 10/2018 | H04L 63/08 |
| WO | WO-2019223651 A1 | * | 11/2019 | H04W 4/12 |
| WO | 2020167615 A1 | | 8/2020 | |
| WO | 2021129603 A1 | | 7/2021 | |
| WO | 2023020708 A1 | | 2/2023 | |

* cited by examiner

DELIVERY OF GEOGRAPHIC LOCATION FOR USER EQUIPMENT (UE) IN A WIRELESS COMMUNICATION NETWORK

RELATED CASES

This United States Patent Applications is a continuation of U.S. patent application Ser. No. 17/495,633 that was filed on Oct. 6, 2021 and is entitled "DELIVERY OF GEOGRAPHIC LOCATION FOR USER EQUIPMENT (UE) IN A WIRELESS COMMUNICATION NETWORK." U.S. patent application Ser. No. 17/495,633 is hereby incorporated by reference into this United States Patent Applications.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless network elements comprise Unified Data Repositories (UDRs), Unified Data Management (UDM), Access and Mobility Management Functions (AMFs), Authentication and Security Functions (AUSFs), and the like.

The wireless user devices and the AMFs communicate over the wireless access nodes. The AMFs authenticate the wireless user devices before delivering non-emergency services to the wireless user devices. To authenticate a wireless user device, a UDM retrieves a secret key for the wireless user device from the UDR. The UDM hashes the key with a random number to generate a result. The UDM transfers the random number and result to the AMF over the AUSF. The AMF transfers the random number to the wireless user device over a wireless access node. The wireless user device hashes its copy of the secret key with the random number to generate the same result. The wireless user device transfers the result to the AMF over the wireless access node. The AMF matches the results from the wireless user device and the UDM to authenticate the wireless user device.

The AMFs provide the geographic locations of the wireless user devices to network elements that request the locations. When a network element requests the geographic location of a wireless user device, the AMF initiates a location session with the wireless user device over the wireless access node and may use a Location Management Function (LMF) on the session to assist with the location determination. The location determination uses satellite positioning, radio triangulation, or some other technique. The geographic location could be geo-coordinates, place-name, area ID, or some other geographic indicator. The AMF transfers the geographic location for the wireless user device to the requesting network element.

Unfortunately, the wireless communication networks do not efficiently and effectively serve the geographic locations for the wireless user devices. Moreover, the wireless communication networks force the network elements to wait before receiving the requested geographic locations for the UEs which delays their service delivery to the wireless user devices.

Technical Overview

In some examples, a wireless communication network serves a User Equipment (UE) based on geographic coordinates for the UE. The wireless communication network exchanges authentication data with the UE and authenticates an identity of the UE. The wireless communication network obtains the geographic coordinates from the UE in response to authenticating the identity of the UE. The wireless communication network determines UE context for the UE based on the geographic coordinates for the UE. The wireless communication network exchanges user data with the UE based on the UE context. The wireless communication network receives a location request for the UE and responds to the location request with the geographic coordinates for the UE.

In some examples, a wireless communication network serve a User Equipment (UE) based on a geographic location of the UE. An Access and Mobility Management Function (AMF) retrieves authentication data for the UE. A Uniform Data Repository (UDR) transfers a location request for the UE in response to the retrieval of the authentication data for the UE. The AMF transfers the geographic location for the UE to the UDR in response to the location request. A Network Exposure Function (NEF) receives a location request for the UE from an Application Server (AS) that is external to the wireless communication network, and in response, the NEF retrieves the geographic location for the UE from the UDR and transfers the geographic location for the UE to the AS that is external to the wireless communication network.

In some examples, a wireless communication network serves a User Equipment (UE) based on geographic coordinates for the UE. An Access and Mobility Management Function (AMF) exchanges authentication data with the UE and authenticates an identity of the UE. The AMF obtains the geographic coordinates from the UE in response to authenticating the identity of the UE. The AMF determines UE context for the UE based on the geographic coordinates for the UE. A User Plane Function (UPF) exchanges user data with the UE based on the UE context. A Network Exposure Function (NEF) receives a location request for the UE and respond to the location request with the geographic coordinates for the UE.

DETAILED DESCRIPTION

Figure 1:
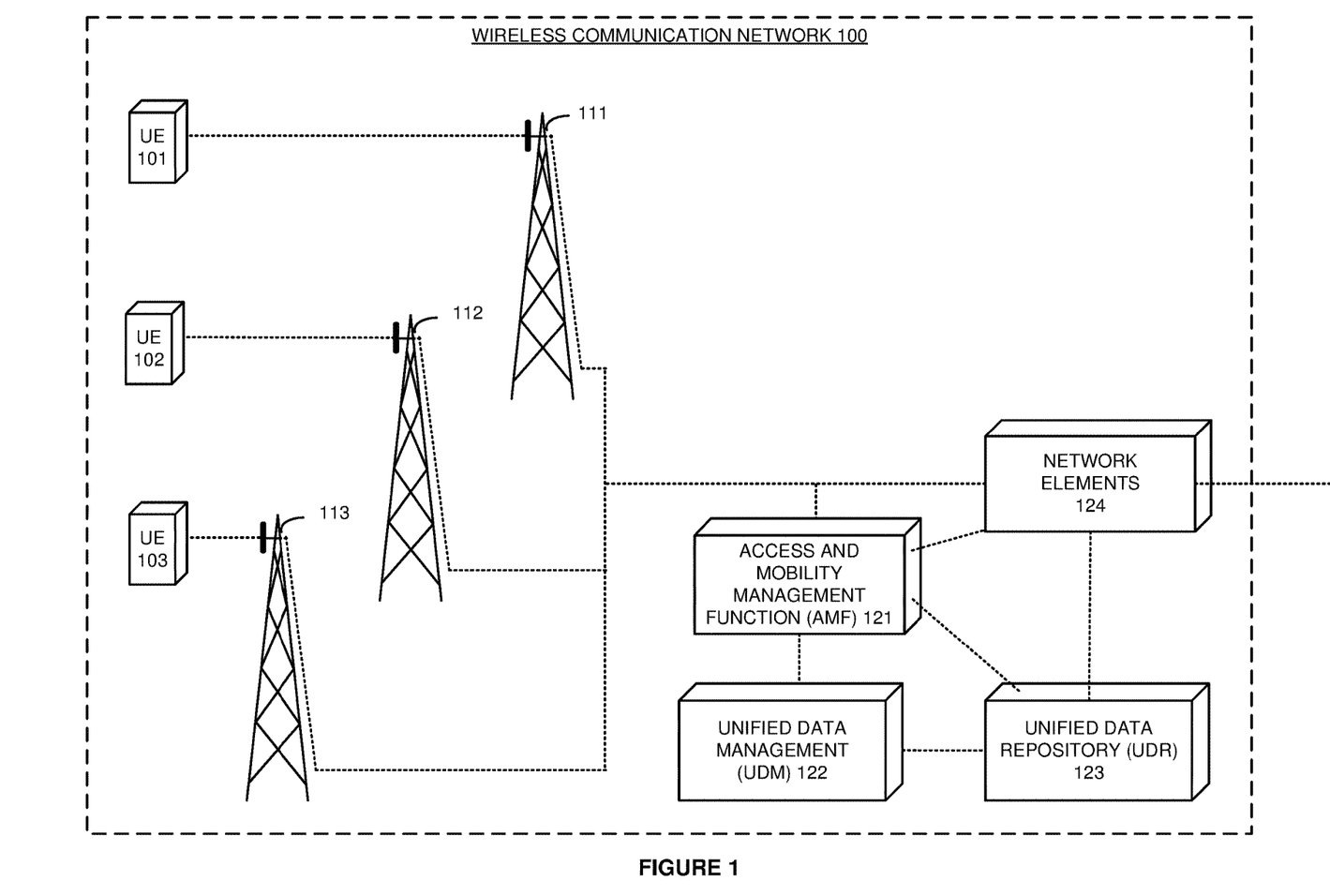
FIG. 1 illustrates an exemplary wireless communication network that serves User Equipment (UEs) and delivers geographic locations for the UEs upon request.

FIG. 1 illustrates exemplary wireless communication network 100 that serves User Equipment (UEs) 101-103 and delivers geographic locations for UEs 101-103 upon request. Wireless communication network 100 comprises UEs 101-103, wireless access nodes 111-113, Access and Mobility Management Function (AMF) 121, Unified Data Management (UDM) 122, Unified Data Repository (UDR) 123, and network elements 124. UEs 101-103 comprise computers, phones, vehicles, sensors, robots, or some other data appliance with communication circuitry. Network elements 124 comprise User-Plane Functions (UPFs), Policy Control Functions (PCFs), Network Exposure Functions (NEFs), and/or some other network apparatus. Wireless communication network 100 is simplified for clarity and typically includes far more UEs and access nodes than shown.

Various examples of network configuration and operation are described herein. In some examples, UDR 123 exchanges authentication signaling for UE 101 with UDM 122, and in response, UDR 123 transfers a location query for the UE 101 to an AMF 121. AMF 121 receives the location query for UE 101 from UDR 123 and responsively determines the geographic location of UE 101. The geographic location of UE 101 could be geographic coordinates for UE 101 or a name for the geographic coordinates like a home, school, or business. AMF 121 may determine the geographic location of UE 101 by exchanging location signaling with a Location Management Function (LMF), wireless access node 111, and/or UE 101. AMF 121 transfers a location answer to UDR 123 that indicates the geographic location of UE 101. UDR 123 receives the location answer from AMF 121. UDR 123 receives a location request from one of network elements 124 for the geographic location of UE 101. In response, UDR 123 transfers a location response that indicates the geographic location of UE 101 to the requesting one of network elements 124. Advantageously, wireless communication network 100 efficiently and effectively serves the geographic locations for UEs 101-103 to network elements 124. Moreover, wireless communication network 100 does not force network elements 124 to wait through the location session before receiving the requested geographic locations to speed-up service delivery to UEs 101-103.

UEs 101-103 and wireless access nodes 111-113 communicate over wireless links that use wireless technologies like Fifth Generation New Radio (5GNR), Long Term Evolution (LTE), Institute of Electrical and Electronic Engineers (IEEE) 802.11 (WIFI), Low-Power Wide Area Network (LP-WAN), Bluetooth, and/or some other wireless communication protocols. The components of wireless communication network 100 communicate over network connections that comprise metallic wiring, glass fibers, radio channels, or some other communication media. The network connections use technologies like IEEE 802.3 (ETHERNET), Internet Protocol (IP), Time Division Multiplex (TDM), Data Over Cable System Interface Specification (DOCSIS), General Packet Radio Service Transfer Protocol (GTP), 5GNR, LTE, WIFI, LP-WAN, Bluetooth, virtual switching, inter-processor communication, bus interfaces, and/or some other data communication protocols. UEs 101-103 and wireless access nodes 111-113 comprise radios. UEs 101-103, wireless access nodes 111-113, AMF 121, UDM 122, UDR 123, and network elements 124 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
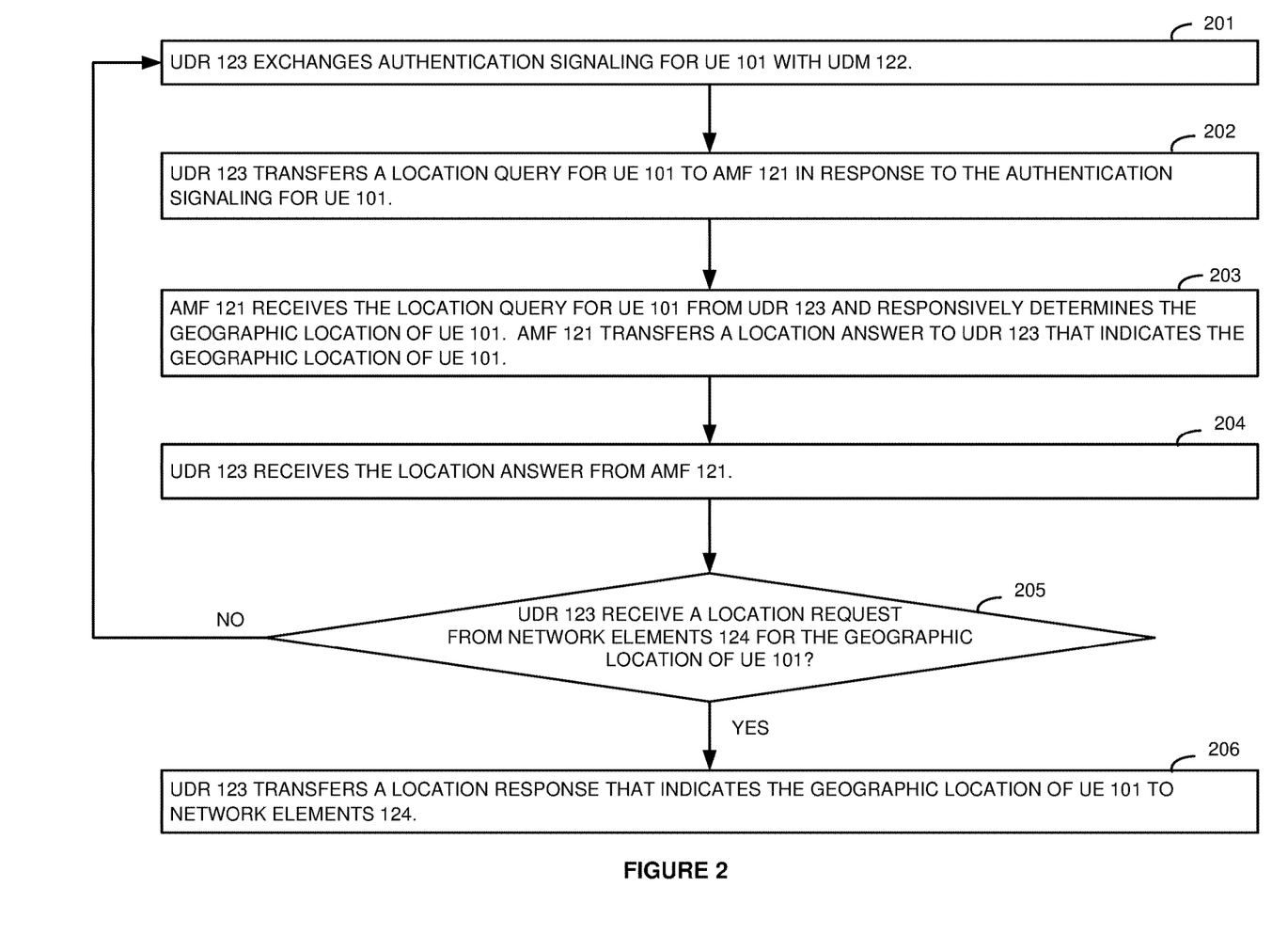
FIG. 2 illustrates an exemplary operation of the wireless communication network to serve the UEs and deliver the geographic locations for the UEs upon request.

FIG. 2 illustrates an exemplary operation of wireless communication network 100 to serve UEs 101-103 and deliver the geographic locations for UEs 101-103 upon request. UDR 123 exchanges authentication signaling for UE 101 with UDM 122 (201), In response to the authentication signaling for UE 101, UDR 123 transfers a location query for UE 101 to AMF 121 (202). AMF 121 receives the location query for UE 101 from UDR 123 and responsively determines the geographic location of UE 101 (203). AMF 121 transfers a location answer to UDR 123 that indicates the geographic location of UE 101 (203). UDR 123 receives the location answer from AMF 121 (204). When UDR 123 receives a location request from network elements 124 for the geographic location of UE 101 (205), UDR 123 transfers a location response that indicates the geographic location of UE 101 to network elements 124 (206). When UDR 124 does not receive a location request from network elements 124 for the geographic location of UE 101 (205), the operation repeats (201).

Figure 3:
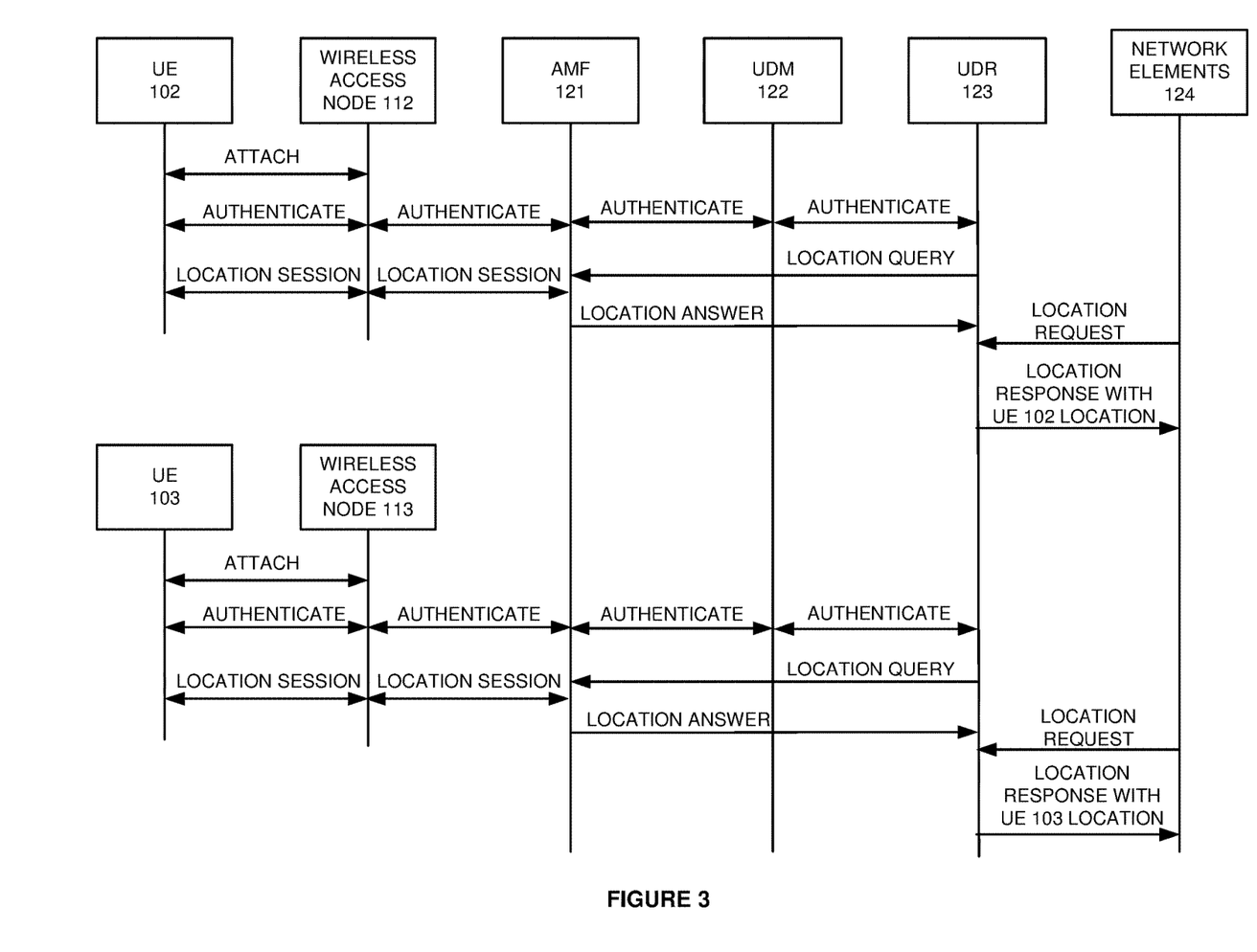
FIG. 3 illustrates an exemplary operation of the wireless communication network to serve the UEs and deliver the geographic locations for the UEs upon request.

FIG. 3 illustrates an exemplary operation of wireless communication network 100 to serve UEs 101-103 and deliver the geographic locations for UEs 101-103 upon request. UE 102 attaches to wireless access node 112. UE 102 and AMF 121 exchange authentication signaling over wireless access node 112. AMF 121 and UDM 122 exchange authentication signaling for UE 102—typically over an Authentication and Security Function (AUSF) that is omitted for clarity. UDM 122 and UDR 123 exchange authentication signaling for UE 102. In response to the authentication signaling for UE 102, UDR 123 transfers a location query for UE 102 to AMF 121. AMF 121 responsively determines the geographic location of UE 102 through a location session with UE 102 over wireless access node 112. AMF 121 transfers a location answer to UDR 123 that indicates the geographic location of UE 102. When UDR 123 receives a location request from network elements 124 for the geographic location of UE 102, UDR 123 transfers a location response that indicates the geographic location of UE 102 to network elements 124.

UE 103 attaches to wireless access node 113. UE 103 and AMF 121 exchange authentication signaling over wireless access node 112. AMF 121 and UDM 122 exchange authentication signaling for UE 103 typically over an AUSF that is omitted for clarity. UDM 122 and UDR 123 exchange authentication signaling for UE 103. In response to the authentication signaling for UE 103, UDR 123 transfers a location query for UE 103 to AMF 121. AMF 121 responsively determines the geographic location of UE 103 through a location session with UE 103 over wireless access node 113. AMF 121 transfers a location answer to UDR 123 that indicates the geographic location of UE 103. When UDR 123 receives a location request from network elements 124 for the geographic location of UE 103, UDR 123 transfers a location response that indicates the geographic location of UE 103 to network elements 124.

Figure 4:
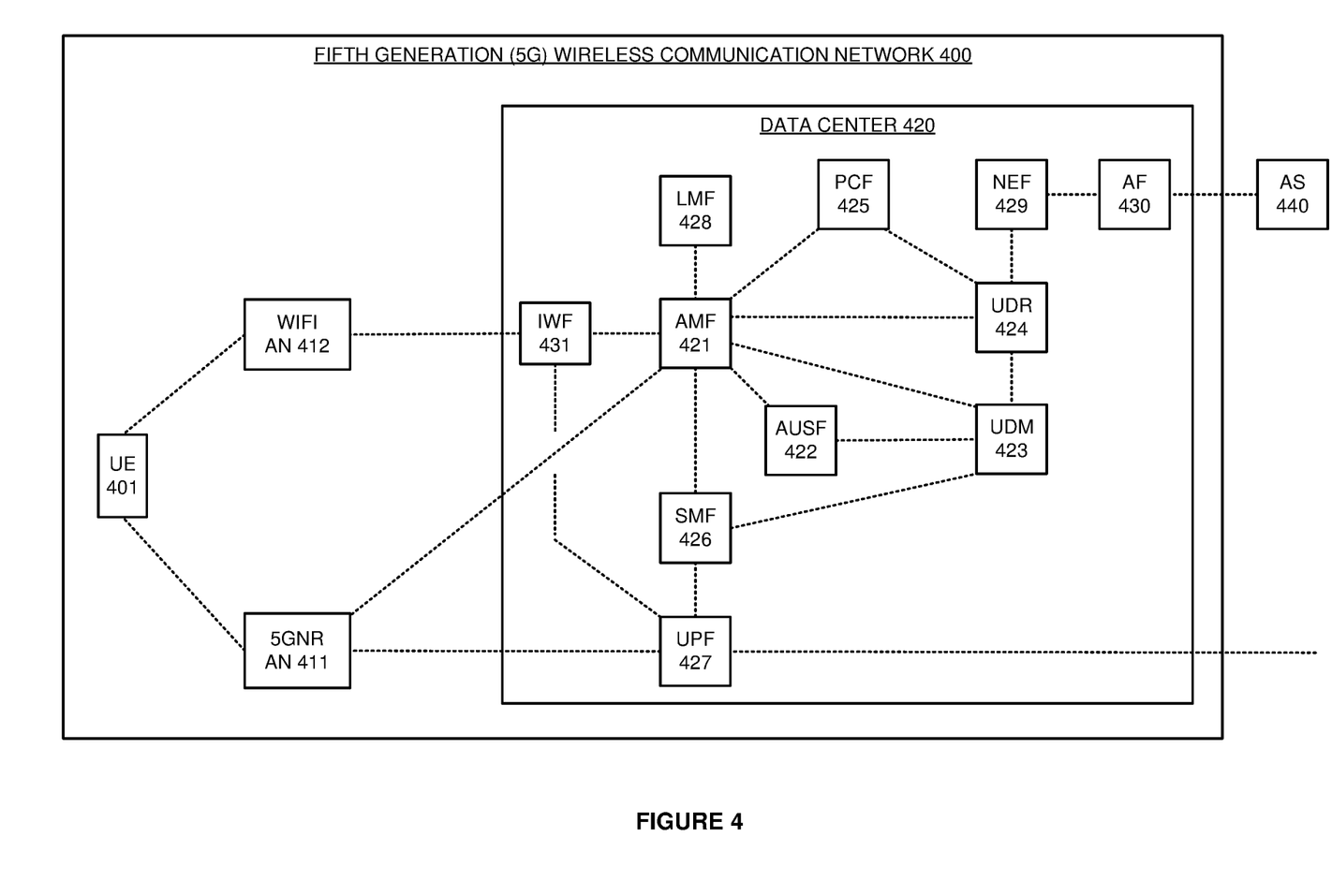
FIG. 4 illustrates an exemplary Fifth Generation (5G) wireless communication network that serves a UE and delivers the geographic location of the UE upon request.

FIG. 4 illustrates an exemplary Fifth Generation (5G) wireless communication network 400 that serves UE 401 and delivers the geographic location of UE 401 upon request. 5G wireless communication network 400 comprises an example of wireless communication network 100, although network 100 may differ. 5G wireless communication network 400 comprises: UE 401, 5GNR Access Node (AN) 411, WIFI AN 412, and data center 420. Data center 420 comprises Access and Mobility Management Function (AMF) 421, Authentication and Security Function (AUSF) 422, Unified Data Management (UDM) 423, Unified Data Repository (UDR) 424, Policy Control Function (PCF) 425, Session Management Function (SMF) 426, User Plane Function (UPF) 427, Location Management Function (LMF) 428, Network Exposure Function (NEF) 429, Application Function (AF) 430, and Interworking Function (IWF) 431. Wireless communication network 400 is simplified for clarity and typically includes far more UEs, ANs, data centers, and network functions than shown.

UE 401 wirelessly attaches to 5GNR AN 411. UE 401 registers with AMF 421 over 5GNR AN 411 and AMF 421 authenticates UE 401. To perform the authentication, UE 401 transfers its Subscriber Concealed Identifier (SUCI) to AMF 421. AMF 421 transfers the SUCI for UE 401 to AUSF 422. AUSF 422 transfers the SUCI for UE 401 to UDM 423. UDM 423 retrieves a secret key and Subscriber Permanent Identifier (SUPI) for UE 401 from UDR 424 based on the SUCI. UDM 423 generates an expected result based on the secret key and a random number. UDM 423 transfers the random number, expected result, and SUPI for UE 401 to AUSF 422. AUSF 422 transfers the random number and expected result to AMF 421. AMF 421 transfers the random number to UE 401 over 5GNR AN 411. UE 401 generates the expected result based on its own copy of the secret key and the random number. UE 401 transfers the expected result to AMF 421 over 5GNR AN 411. AMF 421 matches the expected results from UE 401 and AUSF 422 to authenticate UE 401. AMF 421 notifies AUSF 422 that UE 401 is authentic, and in response, AUSF 422 transfers the SUPI for UE 401 to AMF 421.

When UDM 423 retrieves the secret key and SUPI for UE 401 from UDR 424 based on the SUCI, UDR 424 responsively transfers a location query for UE 401 to AMF 421. In response to the location query, AMF 421 initiates a location session between UE 401 and LMF 428 to determine the geographic location for UE 401 through UE satellite positioning, radio triangulation, or some other technique. The geographic location could be geo-coordinates, place-name, area ID, or some other geographic indicator. AMF 421 transfers the geographic location for UE 401 to UDR 424 in response to the location request from UDR 424.

AMF 421 requests context information for UE 401 from UDM 423. UDM 423 may retrieve the geographic location of UE 401 from UDR 424, and UDM 423 may select context for UE 401 based on the geographic location. UDM 423 transfers context for UE 401 to AMF 421. AMF 421 requests context information for UE 401 from PCF 425. PCF 425 may retrieve the geographic location of UE 401 from UDR 424, and PCF 425 may select context for UE 401 based on the geographic location for UE 401. PCF 425 transfers context for UE 401 to AMF 421. AMF 421 transfers the context for UE 401 to SMF 426. AMF 421 transfers the context for UE 401 to 5GNR AN 411. AMF 421 transfers the context to UE 401 over 5GNR AN 411. SMF 426 transfers the context for UE 401 to UPF 427. UE 401 and external systems exchange user data over 5GNR AN 411 and UPF 427 per the context.

AS 440 requests the geographic location of UE 401 from AF 430. AF 430 requests the geographic location of UE 401 from NEF 429. NEF 429 requests the geographic location of UE 401 from UDR 424. UDR 424 transfers the geographic location of UE 401 from AMF 421 to NEF 429. NEF 429 transfers the geographic location of UE 401 to AF 430. AF 430 transfers the geographic location of UE 401 to AS 440.

UE 401 may wirelessly attach to WIFI AN 412. UE 401 registers with IWF 431 over WIFI AN 412. UE 401 registers with AMF 421 over WIFI AN 412 and IWF 431. AMF 421 authenticates UE 401. To perform the authentication, UE 401 transfers its SUCI to AMF 421. AMF 421 transfers the SUCI for UE 401 to AUSF 422. AUSF 422 transfers the SUCI for UE 401 to UDM 423. UDM 423 retrieves a secret key and SUPI for UE 401 from UDR 424 based on the SUCI. UDM 423 generates an expected result based on the secret key and a random number. UDM 423 transfers the random number, expected result, and SUPI for UE 401 to AUSF 422. AUSF 422 transfers the random number to AMF 421. AMF 421 transfers the random number to UE 401 over IWF 431 and WIFI AN 412. UE 401 generates the expected result based on its own copy of the secret key and the random number. UE 401 transfers the expected result to AMF 421 over 5GNR AN 411 and IWF 431. AMF 421 matches the expected results from UE 401 and AUSF 422 to authenticate UE 401. AMF 421 notifies AUSF 422 that UE 401 is authentic. AUSF 422 transfers the SUPI for UE 401 to AMF 421.

When UDM 423 retrieves the secret key and SUPI for UE 401 from UDR 424 based on the SUCI, UDR 424 responsively transfers a location query for UE 401 to AMF 421. AMF 421 initiates a location session between UE 401 and LMF 428 to determine the geographic location for UE 401 through UE satellite positioning, radio triangulation, or some other technique. The geographic location could be geo-coordinates, place-name, area ID, or some other geographic indicator. AMF 421 transfers the geographic location for UE 401 to UDR 424 in response to the location request from UDR 424.

Figure 5:
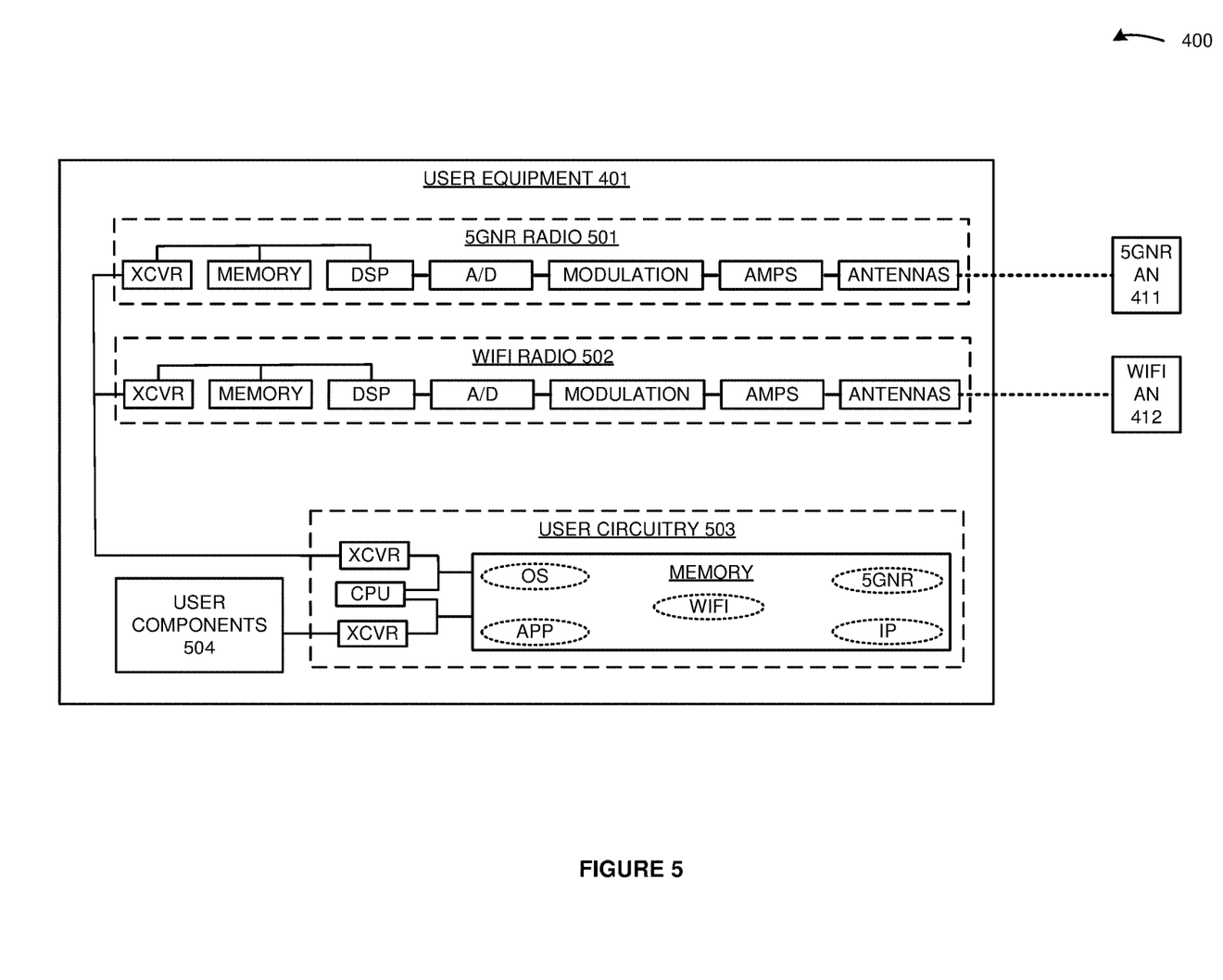
FIG. 5 illustrates the exemplary UE in the 5G wireless communication network.

FIG. 5 illustrates exemplary UE 401 in 5G wireless communication network 400. UE 401 comprises an example of UEs 101-103, although these UEs may differ. UE 401 comprises 5GNR radio 501, WIFI radio 502, user circuitry 503, and user components 504. User components 504 comprise sensors, controllers, displays, or some other user apparatus. Radios 501-502 comprise antennas, amplifiers, filters, modulation, analog-to-digital interfaces, DSP, memory, and transceivers that are coupled over bus circuitry. User circuitry 504 comprises memory, CPU, user interfaces and components, and transceivers that are coupled over bus circuitry. The memory in user circuitry 503 stores an operating system (OS), user applications (APP), and network applications for WIFI, 5GNR, and IP. The antennas in 5GNR radio 501 are wirelessly coupled to 5GNR AN 411 over a 5GNR link. The antennas in WIFI radio 502 are wirelessly coupled to WIFI AN 412 over a WIFI link. Transceivers (XCVRs) in radios 501-502 are coupled to transceivers in user circuitry 503. Transceivers in user circuitry 503 are coupled to user components 504. The CPU in user circuitry 503 executes the operating system, user applications, and network applications to exchange network signaling and user data with ANs 411-412.

Figure 6:
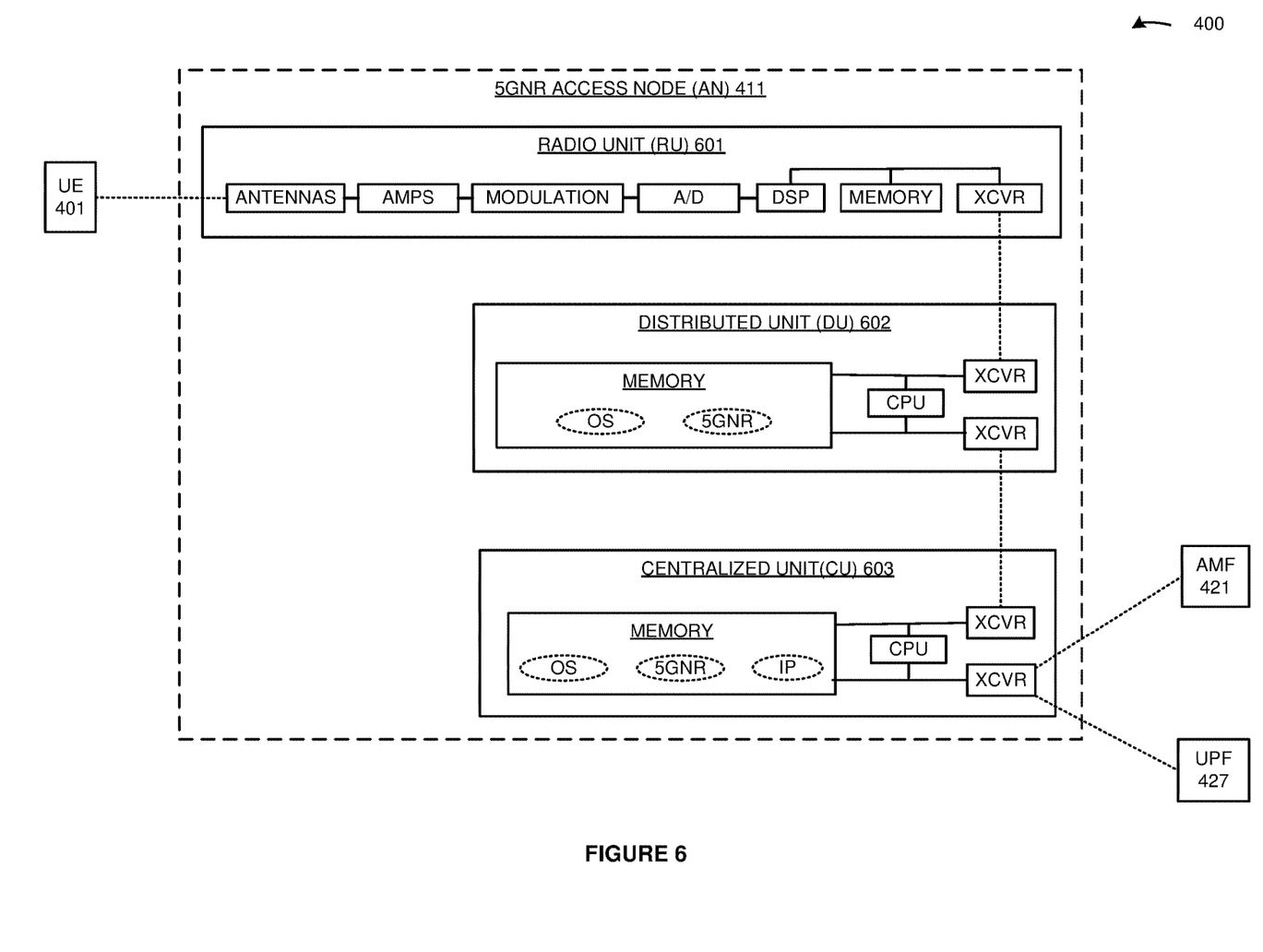
FIG. 6 illustrates an exemplary 5G new radio access node in the 5G wireless communication network.

FIG. 6 illustrates exemplary 5G New Radio (NR) Access Node (AN) 411 in 5G wireless communication network 400. 5GNR AN 411 comprises an example of wireless access nodes 111-113, although access nodes 111-113 may differ. 5GNR AN 411 comprises Radio Unit (RU) 601, Distributed Unit (DU) 602, and Centralized Unit (CU) 603. RU 601 comprises 5GNR antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores an operating system and 5GNR network applications (Physical Layer, Media Access Control, Radio Link Control). CU 603 comprises memory, CPU, user interfaces and components, and transceivers that are coupled over bus circuitry. The memory in CU 603 stores an operating system, IP, and 5GNR network applications (Packet Data Convergence Protocol, Service Data Adaptation Protocol, Radio Resource Control). The antennas in RU 601 are wirelessly coupled to UE 401 over a 5GNR link. Transceivers in RU 601 are coupled to transceivers in DU 602. Transceivers in DU 602 are coupled to transceivers in CU 603. Transceivers in CU 603 are coupled to AMF 421 and UPF 427. The DSP and CPU in RU 601, DU 602, and CU 603 execute operating systems, radio applications, and 5GNR applications to exchange network signaling and user data with UE 401, AMF 421, and UPF 427.

Figure 7:
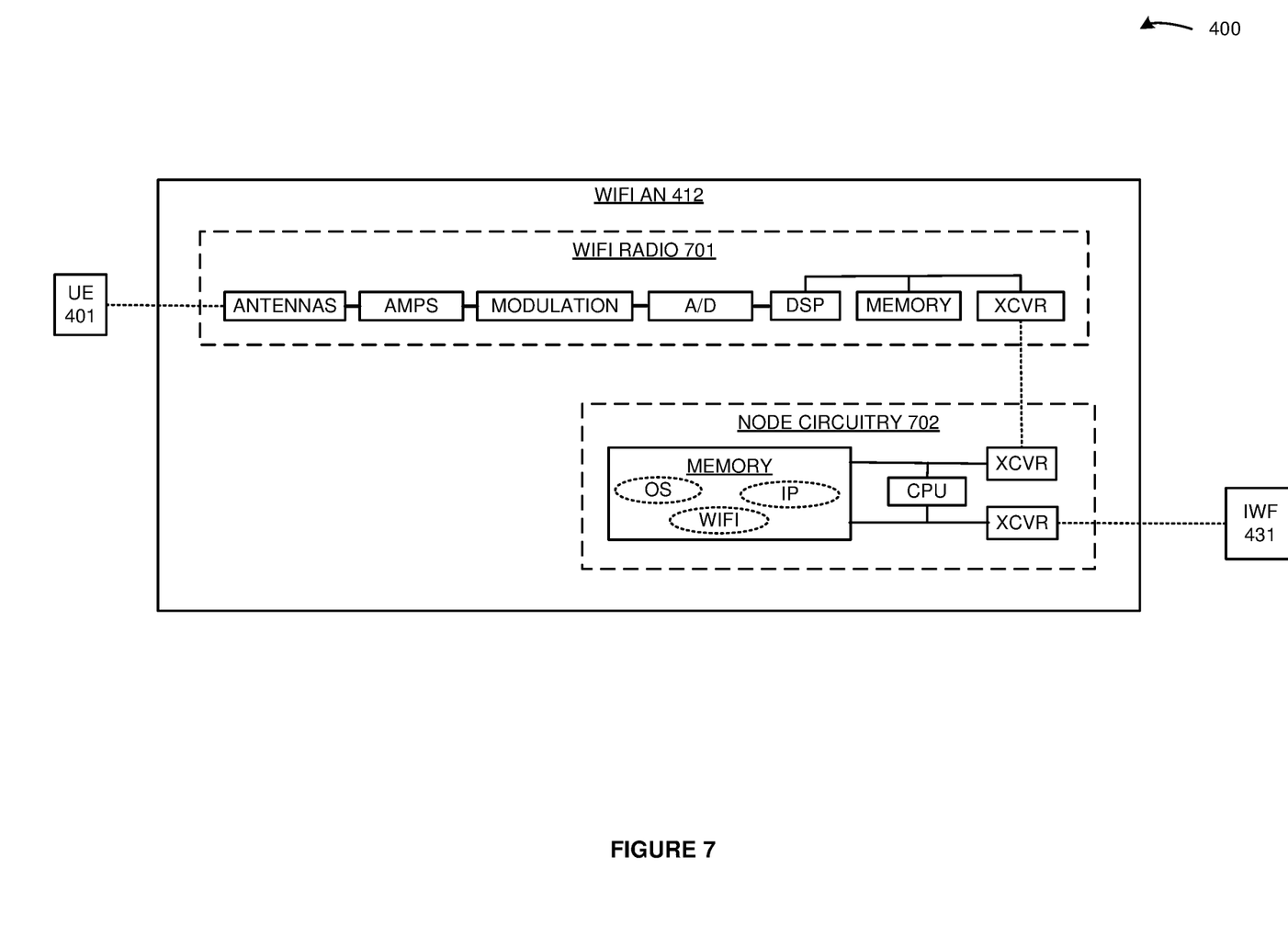
FIG. 7 illustrates an exemplary wireless fidelity access node in the 5G wireless communication network.

FIG. 7 illustrates exemplary WIFI AN node 412 in 5G wireless communication network 400. WIFI AN node 412 comprises an example of wireless access nodes 111-113, although access nodes 111-113 may differ. WIFI AN 412 comprises WIFI radio 701 and node circuitry 702. WIFI radio 701 comprises antennas, amplifiers, filters, modulation, analog-to-digital interfaces, DSP, memory, and transceivers that are coupled over bus circuitry. Node circuitry 702 comprises memory, CPU, user interfaces and components, and transceivers that are coupled over bus circuitry. The memory in node circuitry 702 stores an operating system and network applications for IP and WIFI. The antennas in WIFI radio 701 are wirelessly coupled to UE 401 over a WIFI link. Transceivers in WIFI radio 701 are coupled to transceivers in node circuitry 702. Transceivers in node circuitry 702 are coupled to transceivers in IWF 431. The CPU in node circuitry 702 executes the operating system and network applications to exchange network signaling and user data with UE 401 and with IWF 431.

Figure 8:
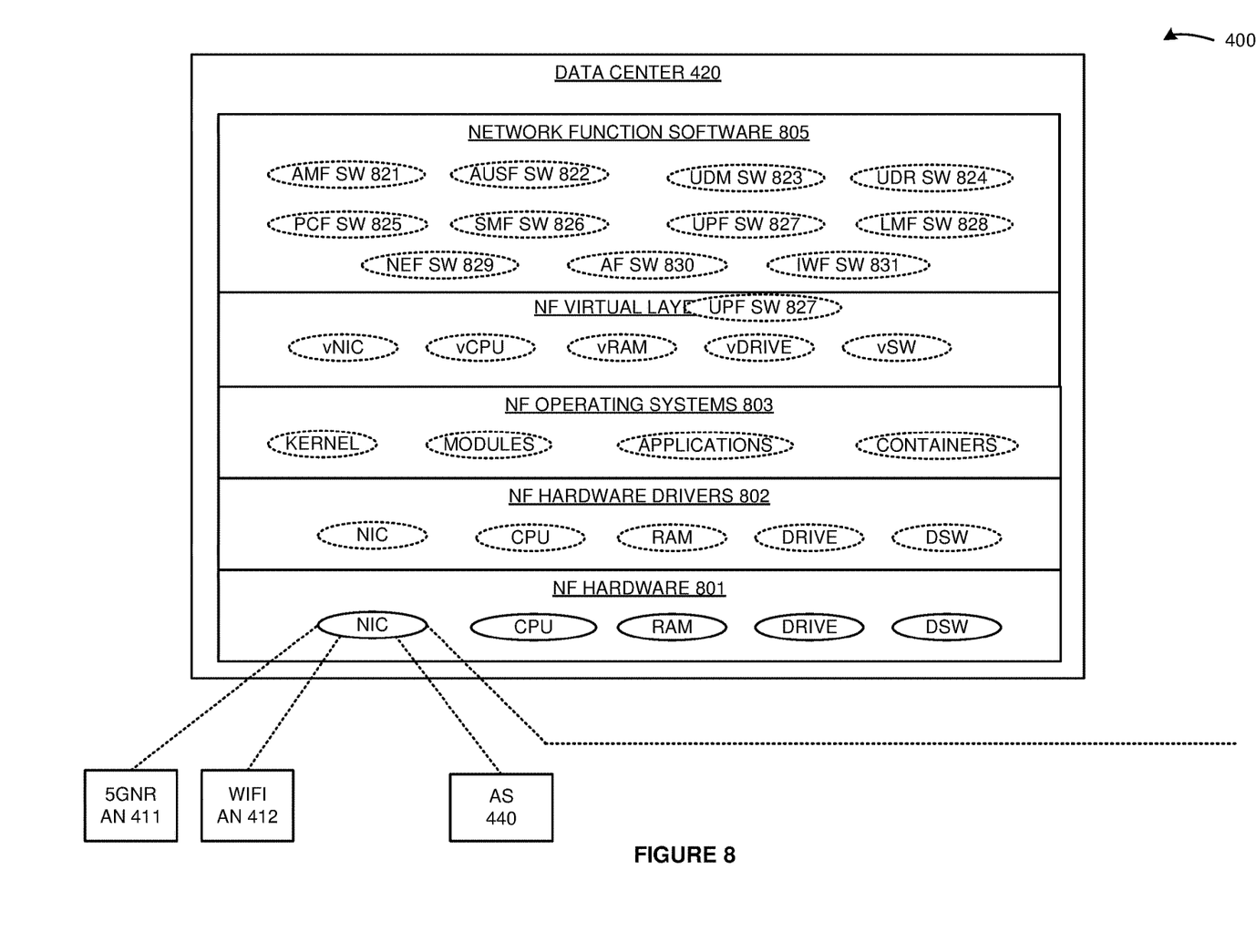
FIG. 8 illustrates an exemplary data center in the 5G wireless communication network.

FIG. 8 illustrates exemplary data center 420 in 5G wireless communication network 400. Data center 420 comprises an example of AMF 121, UDM 122, UDR 123, and network elements 124, although these network functions and elements may differ. Data center 420 comprises Network Function (NF) hardware 801, NF hardware drivers 802, NF operating systems 803, NF virtual layer 804, and NF Software (SW) 805. NF hardware 801 comprises Network Interface Cards (NICs), CPU, RAM, Flash/Disk Drives (DRIVE), and Data Switches (DSW). NF hardware drivers 802 comprise software that is resident in the NIC, CPU, RAM, DRIVE, and DSW. NF operating systems 803 comprise kernels, modules, and applications that form containers for virtual layer and NF software execution. NF virtual layer 804 comprises vNIC, vCPU, vRAM, vDRIVE, and vSW. NF SW 805 comprises AMF SW 821, AUSF SW 822, UDM SW 823, UDR SW 824, PCF SW 825, SMF SW 826, UPF SW 827, LNF SW 828, NEF SW 829, AF SW 830, and IWF SW 831. Other NFs like Network Repository Function (NRF) are typically present but are omitted for clarity. Data center 420 may be located at a single site or be distributed across multiple geographic locations. The NIC in NF hardware 801 are coupled to 5GNR AN 411, WIFI AN 412, AS 440, and external systems. NF hardware 801 executes NF hardware drivers 802, NF operating systems 803, NF virtual layer 804, and NF SW 805 to form and operate AMF 421, AUSF 422, UDM 423, UDR 424, PCF 425, SMF 426, UPF 427, LMF 428, NEF 429, AF 430, and IWF 431.

Figure 9:
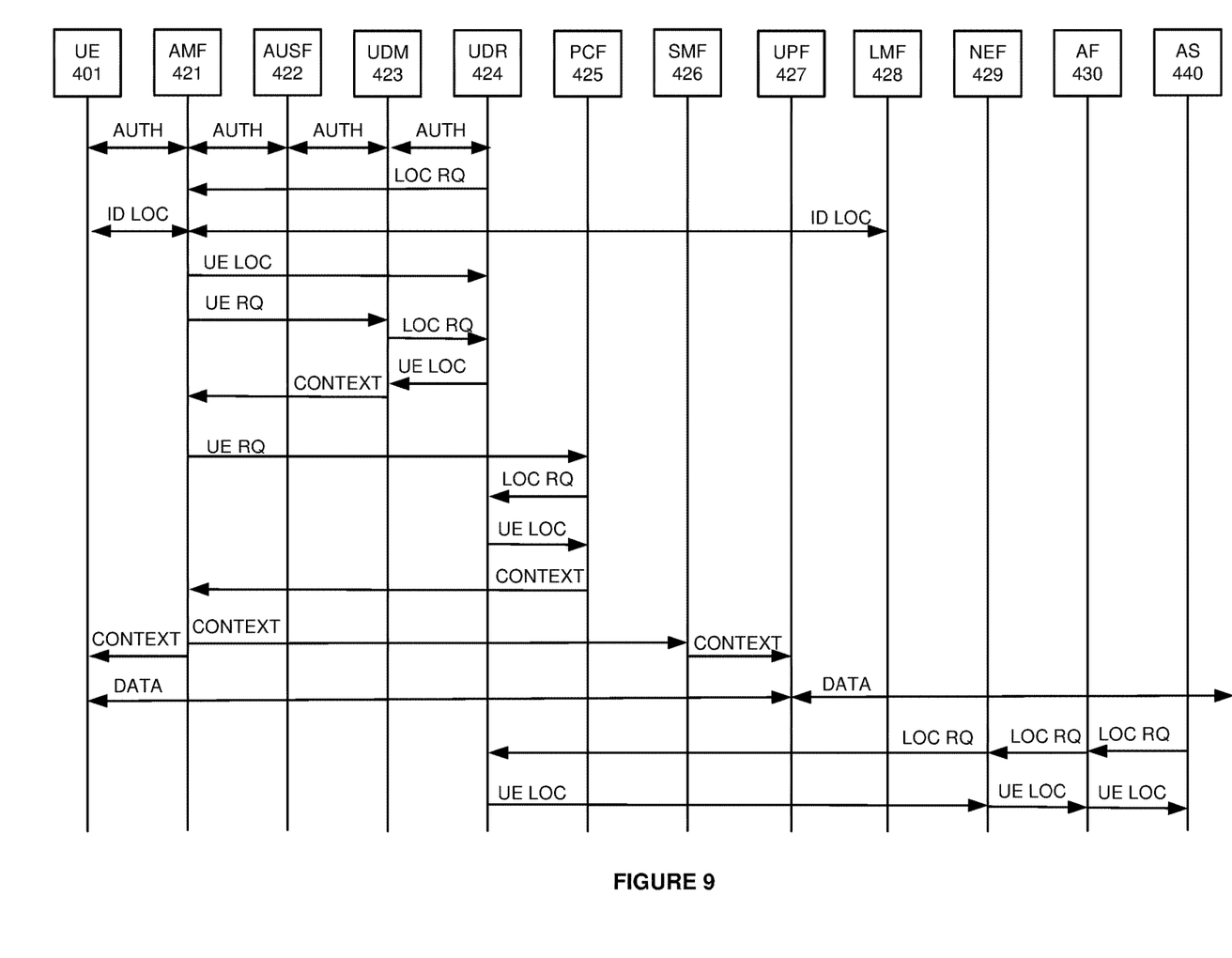
FIG. 9 illustrates an exemplary operation of the 5G wireless communication network to serve the UE and deliver the geographic location of the UE upon request.

FIG. 9 illustrates an exemplary operation of 5G wireless communication network 400 to serve UE 401 and deliver the geographic location of UE 401 upon request. The operation may vary in other examples. The arrows that are labeled "AUTH" at the top of FIG. 9 represent an authentication session for UE 401. During the authentications session, UE 401 transfers its SUCI to AMF 421. AMF 421 transfers the SUCI for UE 401 to AUSF 422. AUSF 422 transfers the SUCI for UE 401 to UDM 423. UDM 423 retrieves a secret key and SUPI for UE 401 from UDR 424 based on the SUCI. UDM 423 generates an expected result based on the secret key and a random number. UDM 423 transfers the random number, expected result, and SUPI for UE 401 to AUSF 422. AUSF 422 transfers the random number and expected result to AMF 421. AMF 421 transfers the random number to UE 401. UE 401 generates the expected result based on its own copy of the secret key and the random number. UE 401 transfers the expected result to AMF 421. AMF 421 matches the expected results from UE 401 and AUSF 422 to authenticate UE 401. AMF 421 notifies AUSF 422 that UE 401 is authentic. AUSF 422 transfers the SUPI for UE 401 to AMF 421. The authentication session ends.

In response to the authentication of UE 401, UDR 424 transfers a location request (LOC RQ) for UE 401 to AMF 421. AMF 421 initiates a location session between UE 401 and LMF 428 to identify the geographic location (ID LOC) for UE 401. The geographic location could be geo-coordinates, place-name, area ID, or some other geographic indicator. AMF 421 transfers the geographic location (UE LOC) for UE 401 to UDR 424 in response to the location request from UDR 424.

AMF 421 requests context information for UE 401 from UDM 423. UDM 423 transfers a location request for UE 401 to UDR 424. UDR 424 transfers the geographic location for UE 401 to UDM 423. UDM 423 selects context for UE 401 based on the geographic location for UE 401 and transfers the context for UE 401 to AMF 421. AMF 421 requests context information for UE 401 from PCF 425. PCF 425 transfers a location request for UE 401 to UDR 424. UDR 424 transfers the geographic location for UE 401 to PCF 425. PCF 425 selects context for UE 401 based on the geographic location for UE 401 and transfers the context for UE 401 to AMF 421. AMF 421 transfers the context for UE 401 to SMF 426 and UE 401. SMF 426 transfers context for UE 401 to UPF 427. UE 401 and external systems exchange user data over UPF 427 per the context.

AS 440 transfers a location request for UE 401 to AF 430. AF 430 transfers the location request for UE 401 to NEF 429. NEF 429 transfers a location request for UE 401 to UDR 424. UDR 424 identifies the geographic location of UE 401 and transfers a location response that indicates the geographic location of UE 401 to NEF 429. NEF 429 transfers the location response that indicates the geographic location of UE 401 to AF 430. AF 430 transfers the location response that indicates the geographic location of UE 401 to AS 440.

The wireless data network circuitry described above comprises computer hardware and software that form special-purpose networking circuitry to serve UEs and deliver the geographic locations of the UEs upon request. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve UEs and deliver the geographic locations of the UEs upon request.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to serve a User Equipment (UE) based on geographic coordinates for the UE, the method comprising:
exchanging authentication data with the UE and authenticating an identity of the UE;
obtaining the geographic coordinates from the UE in response to authenticating the identity of the UE;
determining UE context for the UE based on the geographic coordinates for the UE;
exchanging user data with the UE based on the UE context; and
receiving a location request for the UE and responding to the location request with the geographic coordinates for the UE.

2. The method of claim 1 wherein:
exchanging the authentication data with the UE comprises exchanging the authentication data with the UE over an Institute of Electrical and Electronic Engineers 802.11 (WIFI) access node;
obtaining the geographic coordinates from the UE comprises obtaining the geographic coordinates from the UE over the WIFI access node; and
exchanging user data with the UE comprises exchanging the user data with the UE over the WIFI access node.

3. The method of claim 1 wherein:
exchanging the authentication data with the UE comprises exchanging the authentication data with the UE over a Low-Power Wide Area Network (LP-WAN) access node;
obtaining the geographic coordinates from the UE comprises obtaining the geographic coordinates from the UE over the LP-WAN access node; and
exchanging user data with the UE comprises exchanging the user data with the UE over the LP-WAN access node.

4. The method of claim 1 wherein:
exchanging the authentication data with the UE comprises exchanging the authentication data with the UE over a Bluetooth access node;
obtaining the geographic coordinates from the UE comprises obtaining the geographic coordinates from the UE over the Bluetooth access node; and
exchanging user data with the UE comprises exchanging the user data with the UE over the Bluetooth access node.

5. The method of claim 1 wherein:
exchanging the authentication data with the UE comprises an Access and Mobility Management Function (AMF) exchanging the authentication data with the UE over an Inter-Working Function (IWF) and a wireless access node; and
obtaining the geographic coordinates from the UE comprises the AMF obtaining the geographic coordinates from the UE over the IWF and the wireless access node.

6. The method of claim 1 wherein:
receiving the location request for the UE comprises a Network Exposure Function (NEF) receiving the location request for the UE from an Application Server (AS) over an Application Function (AF); and
responding to the location request with the geographic coordinates for the UE comprises the NEF transferring the geographic coordinates for the UE to the AS over the AF.

7. The method of claim 1 wherein responding to the location request with the geographic coordinates for the UE comprises responding to the location request with the geographic coordinates for the UE without waiting for a location session with the UE to be performed.

8. A method of operating a wireless communication network to serve a User Equipment (UE) based on a geographic location of the UE, the method comprising:
retrieving, by an Access and Mobility Management Function (AMF), authentication data for the UE that is stored in a Uniform Data Repository (UDR);
transferring, by the UDR, a location request for the UE in response to the retrieval of the authentication data for the UE;

transferring, by the AMF, the geographic location for the UE to the UDR in response to the location request;

determining, by the AMF, UE context for UE based on the geographic location; and receiving, by a Network Exposure Function (NEF), a location request for the UE from an Application Server (AS) that is external to the wireless communication network, and in response, retrieving the geographic location for the UE from the UDR and transferring the geographic location for the UE to the AS that is external to the wireless communication network.

9. The method of claim 8 further comprising: generating, by the AMF, UE context for the UE based on the geographic location for the UE; and exchanging, by a User Plane Function (UPF), user data with the UE based on the UE context.

10. The method of claim 8 further comprising: retrieving, by a Policy Control Function PCF), the geographic location for the UE from the UDR and generating UE context for the UE based on the geographic coordinates for the UE; and exchanging, by a User Plane Function (UPF), user data with the UE based on the UE context.

11. The method of claim 8 further comprising: exchanging, by the AMF, additional authentication data with the UE over an Inter-Working Function (IWF) and an Institute of Electrical and Electronic Engineers 802.11 (WIFI) access node; and receiving, by the AMF the geographic location from the UE over the IWF and the WIFI access node.

12. The method of claim 8 wherein the geographic location comprises geographic coordinates for the UE.

13. The method of claim 8 wherein the geographic location comprises a geographic place name for the UE that is based on geographic coordinates for the UE.

14. The method of claim 8 wherein retrieving, by the NEF, the geographic location for the UE from the UDR and transferring, by the NEF, the geographic location for the UE to the AS comprises retrieving the geographic location for the UE from the UDR and transferring the geographic location for the UE to the AS without waiting for a location session with the UE to be performed.

15. A wireless communication network to serve a User Equipment (UE) based on geographic coordinates for the UE, the wireless communication network comprising:

an Access and Mobility Management Function (AMF) to exchange authentication data with the UE and authenticate an identity of the UE; the AMF to obtain the geographic coordinates from the UE in response to authenticating the identity of the UE; the AMF to determine UE context for the UE based on the geographic coordinates for the UE;

a User Plane Function (UPF) to exchange user data with the UE based on the UE context; and a Network Exposure Function (NEF) to receive a location request for the UE and respond to the location request with the geographic coordinates for the UE.

16. The wireless communication network of claim 15 wherein:

the AMF is to exchange the authentication data with the UE over an Institute of Electrical and Electronic Engineers 802.11 (WIFI) access node;

the AMF is to obtain the geographic coordinates from the UE over the WIFI access node; and the UPF is to exchange the user data with the UE over the WIFI access node.

17. The wireless communication network of claim 15 wherein:

the AMF is to exchange the authentication data with the UE over an Inter-Working Function (IWF) and an Institute of Electrical and Electronic Engineers 802.11 (WIFI) access node;

the AMF is to obtain the geographic coordinates from the UE over the IWF and the WIFI access node; and the UPF is to exchange the user data with the UE over the IWF and the WIFI access node.

18. The wireless communication network of claim 15 wherein:

the NEF is to receive the location request for the UE over an Application Function (AF) from an Application Server (AS) that is external to the wireless communication network and to respond to the location request with the geographic coordinates for the UE over the AF to the AS that is external to the wireless communication network.

19. The wireless communication network of claim 15 wherein the NEF is to respond to the location request with the geographic coordinates for the UE without waiting for a location session with the UE to be performed.

20. The wireless communication network of claim 15 wherein the NEF is to respond to the location request with a geographic place name for the UE that is based on the geographic coordinates for the UE.

* * * * *